United States Patent
Zhang

(10) Patent No.: US 7,450,752 B2
(45) Date of Patent: Nov. 11, 2008

(54) SYSTEM AND METHOD FOR AUTOMATIC DETECTION OF THE END OF A VIDEO STREAM

(75) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 11/100,485

(22) Filed: Apr. 7, 2005

(65) Prior Publication Data

US 2006/0230414 A1 Oct. 12, 2006

(51) Int. Cl.
*G06K 9/00* (2006.01)
(52) U.S. Cl. ........................ 382/165; 382/172
(58) Field of Classification Search ........ 382/162, 382/165, 170, 172, 190, 282, 286; 348/700; 386/54, 96
See application file for complete search history.

(56) References Cited

U.S. PATENT DOCUMENTS

| 6,697,564 | B1 * | 2/2004 | Toklu et al. ............ 386/54 |
| 6,738,100 | B2 * | 5/2004 | Hampapur et al. ........ 348/702 |
| 7,127,120 | B2 * | 10/2006 | Hua et al. ................ 382/254 |

* cited by examiner

*Primary Examiner*—Phuoc Tran

(57) ABSTRACT

A method and system for automatic detection of the end of a video stream, wherein the energy level of the audio content is computed, a window at a time. The computed audio energy level is then compared against one or more audio energy level thresholds. Various features of the color content of the video content are then computed, a frame at a time. The computed color content is then compared against one or more video thresholds. Based on the results of the audio and video threshold comparisons, the end of the video stream can be automatically detected.

47 Claims, 11 Drawing Sheets

SYSTEM AND METHOD FOR AUTOMATIC DETECTION OF THE END OF A VIDEO STREAM

BACKGROUND

Prior to the advent of video recorders and VCR's, consumers desiring to capture action scenes were given the single choice of deciding whether to record the action on 8 mm or 16 mm movie film. The consumer recorded scene after scene in sequence until the roll of movie film in the camera was exhausted. The film was then developed for subsequent, sequential viewing. With the advent of VHS, VCR's, and Camcorders, the consumer could now record action scenes, record over scenes not desired to be kept, and add features offered through the camcorder, such as modified lighting.

Audio/video devices, such as Hewlett Packard's DVD Movie Writer™, can now take multimedia video, such as stored on VHS tape, Hi8 tape, Mini-DV tape, CD, and VCD, and transfer the video to digital DVD format with the assistance of a computer, such as a personal computer. The video editing and authoring software of the computer can manipulate the video stream by, for example, editing out undesired scenes, changing the sequence of the recorded scenes, add special effects, and dub in sound and music.

Present DVD movie writers processing an analog video stream cannot detect the end of the video stream on the input media; and, therefore, the user manually inputs the length of video that is to be written. Even digital video occasionally lacks an end of video indicator, such as, for example, when the video stream does not have an end-of-episode marker in the video stream.

SUMMARY

Exemplary embodiments are directed to a computer-implemented method and system for automatic detection of the end of a video stream, including determining an energy level of a window of the audio content; comparing the determined audio energy level against one or more audio energy level thresholds; determining a color content of a frame of the video content; comparing the determined color content against one or more video thresholds; and detecting the end of the video stream based on at least one of the audio energy level and the color content comparisons.

Alternative embodiments provide a computer-based system for automatic detection of the end of a video stream that includes audio content and video content, comprising a processor for executing computer instructions that compute the audio energy level of a window of the audio content; compare the computed audio energy level against one or more predetermined audio energy level thresholds; determine the color content of a frame of the video content; compare the video frame color content against one or more predetermined video thresholds; and detect the end of the video stream based on the comparison of the audio and video content against the one or more predetermined thresholds.

An additional embodiment is also directed to a computer readable medium encoded with computer-executable instructions, which, when executed by a computer, provide for the automatic detection of the end of a video stream, wherein the instructions are provided for separating a video stream into windows of audio content and frames of video content; computing an audio energy level of a window of the audio content; comparing the computed audio energy level against one or more audio energy level thresholds; computing a color content of a frame of the video content; comparing the computed color content against one or more video thresholds; and detecting the end of the video stream based on at least one of the audio energy level comparison and the color content comparison.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EMBODIMENTS

Figure 1:
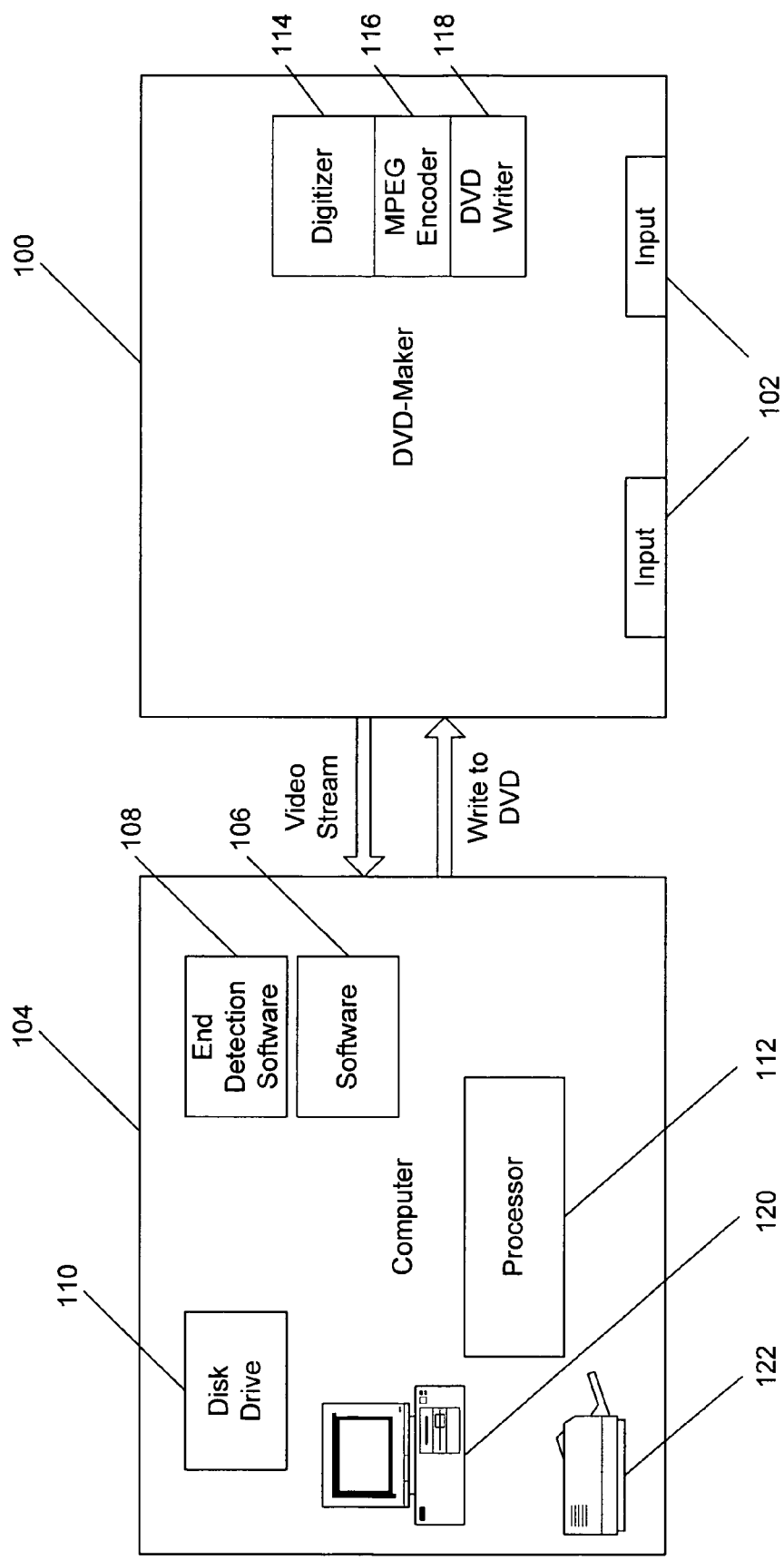
FIG. 1 shows a component diagram of a computer-based system for transferring a video stream onto a DVD.

Referring initially to FIG. 1, there is illustrated a computer-based system for transferring a video stream onto a DVD. The DVD-Maker 100 accepts as input a video stream through one or more video stream input ports 102. As is known in the art, multimedia can be transported across a plurality of means, including USB cables, video cables, wireless transmissions, and the like. Accordingly, exemplary embodiments are provided with a plurality of input ports 102 for accepting the video stream, whether the input stream is integrated audio and video images or, alternately, the input is separate audio frames and video scene frames. The term, "frames," is intended to represent the smallest linear element of the video stream that represents an audio sound or a video image, much like the individual frames of a celluloid movie film. The input video stream can be any video stream format, whether analog or digital, and whether through S-Video, Composite-Video, or IEEE 1394 ports 102, the video can be stored on VHS, Hi-8, or mini-DV tape, or on CD, VCD, DVD, etc. The video can be output from a VCR, a digital camera, an analog or digital camcorder, and the like. Also, the input video stream might have been recorded at different speeds.

The input video stream from port 102 is first digitized using the digitizer 114, encoded to the Moving Picture Experts Group format with the MPEG encoder 116, and then is directed to a computer 104 for video editing and authoring. The computer 104 can be a personal computer and can be a separate computer to which the DVD-Maker 100 is communicatively connected or can be integrated within the DVD- Maker 100 apparatus. The video stream, after being processed by the end detection software 108 and the editing/authoring software 106 of the computer 104, is transmitted back to the DVD-Maker, wherein the video stream is written in digital format onto a DVD.

Computer-executable instructions, or software 106 and 108, are provided for directing the processing of the computer 104, including processing the steps of exemplary embodiments of the video stream end detection system. The software 106 can include video editing and DVD authoring instructions. The computer-executable instructions 108, when executed by the computer 104 and/or the processor 112 of the computer 104, provide for the automatic detection of the end of the video stream. A disk drive 110 is provided for buffering the input video stream. The software 106 and 108 can be stored on the disk drive 110, can be loaded into the memory of the computer 104, or can be stored onto separate storage means within the computer 104. Further, the software 106 and 108 can comprise separate programs and sets of instructions or can be combined into a single program, set of instructions, or program module. Means for supporting a computer-based system for automatic detection of the end of a video stream include the computer 104 and its processor 112, along with the software, or computer instructions, 108 for directing the computer 104 and/or processor 112 to analyze an input video stream and for detecting the end of the video stream.

While FIG. 1 shows the software providing for the detection of the end of a video stream incorporated into the software of the computer connected to the DVD-maker apparatus, exemplary embodiments are not so limited. For example and not limitation, the software for detecting the end of a video stream can be loaded into and executed by a computer that is separate from the DVD-maker apparatus and process. The instructions for video stream end detection can also be stored as firmware within the DVD-Maker 100 and can be executed before or after the MPEG encoding 116. The instructions/software can also be built into the MPEG encoder 116 and executed in conjunction with the encoding process. Further, the end detection software 108 can be within the video stream creation device, such as a video camera or a digital camera.

While the consumer might expect that the audio signals will end on the video stream at approximately the same location as the end of the video signals, in practice the coincidence of the end of the audio and video signals might not exist. For example, the user of a camcorder might place the cap over the lens while leaving the camcorder turned on, thereby continuing to record audio after the video content of the video stream has ended. Further, there might be gaps in the video recording, wherein the audiovisual signal has similar characteristics as the signal after the end of the video recording. Therefore, exemplary embodiments distinguish both the end of audio recording and the end of video recording and further distinguish between gaps in the video stream and the end of the video stream.

These and other aspects of the end detection method and system will now be described in greater detail in connection with a number of exemplary embodiments. To facilitate an understanding of the embodiments, many aspects are described in terms of sequences of actions to be performed by elements of a computer system 104 or apparatus. It will be recognized that in each of the embodiments, the various actions could be performed by specialized circuits, by computer program instructions being executed by one or more processors 112, or by a combination of both. Moreover, embodiments can additionally be considered to be embodied entirely within any form of computer readable storage medium having stored therein an appropriate set of computer instructions that would cause a processor 112 to carry out the techniques described herein.

Figure 2:
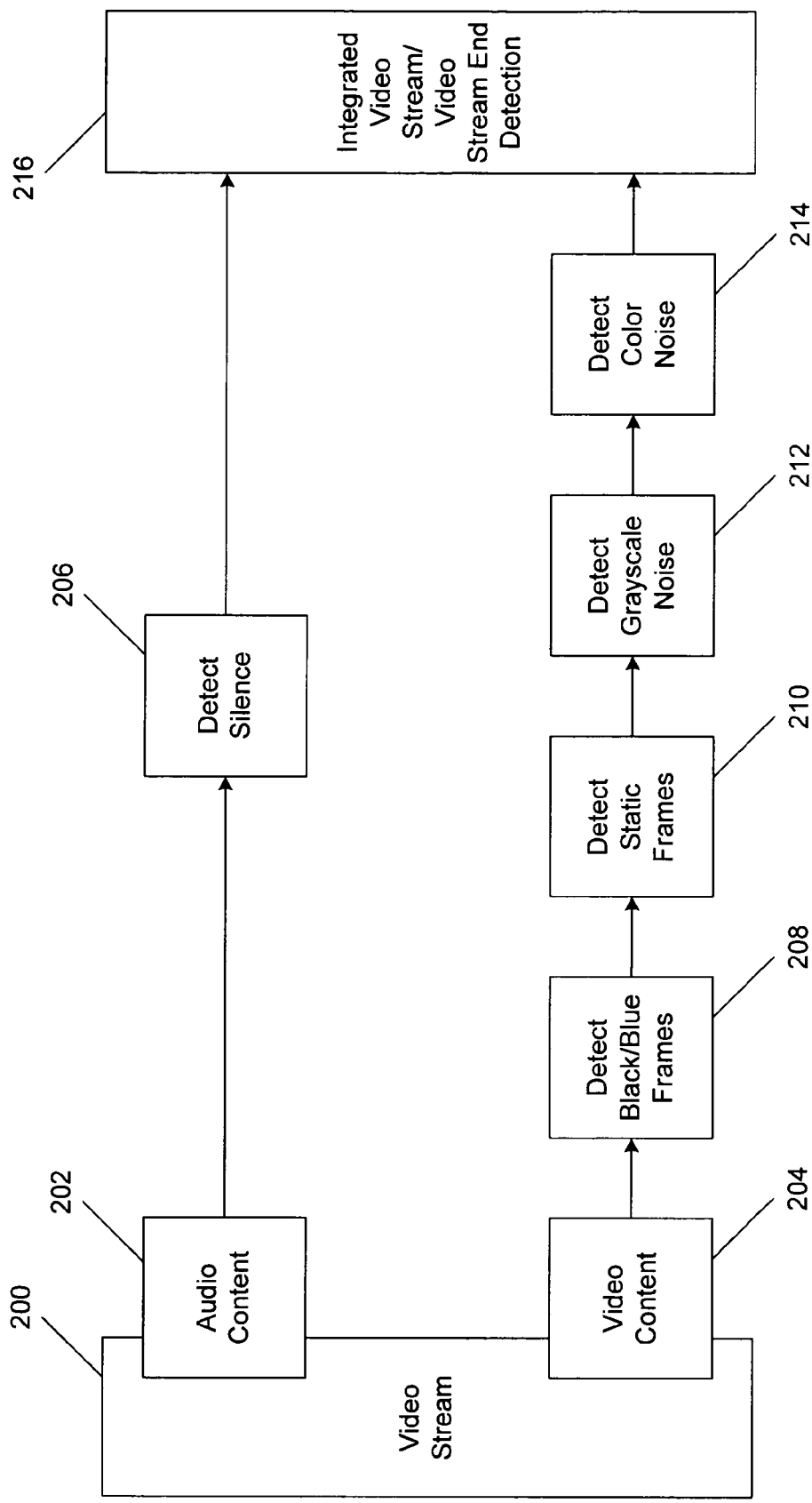
FIG. 2 shows a block flow chart of an exemplary method for automatic detection of the end of a video stream.

The functionality of an embodiment for automatic detection of the end of a video stream can be shown with the following exemplary flow description:

Detection of the End of a Video Stream:
- Process frames of the audio content of the video stream, a window at a time until the end of the audio content is suggested by the detection of a length of silence that exceeds a predetermined length of time ($T_1$)
- Process frames of the video content of the video stream, a frame at a time
  - Detect black/blue frames in the video content for a predetermined length of time ($T_1$), whereupon the end of the video content is suggested
  - Detect static frames in the video content for a predetermined length of time ($T_1$), whereupon the end of the video content is suggested
  - Detect grayscale noise frames in the video content for a predetermined length of time ($T_1$), whereupon the end of the video content is suggested
  - Detect color noise frames in the video content for a predetermined length of time ($T_1$), whereupon the end of the video content is suggested
- Wherein if both the end of the audio content and the end of the video content are suggested, then the end of the video stream is detected
- Wherein if the length of silence exceeds a predetermined length of time ($T_2$) or if any of the detected video end frames are detected for longer than a predetermined length of time ($T_2$), then the end of the video stream is detected Referring now to FIG. 2, there is shown a block flow chart of a method for automatic detection of the end of a video stream according to exemplary embodiments. The input video stream 200, which has been input to the video end detection apparatus 100/104 through input ports 102, comprises both audio content 202 and video content 204 that have been multiplexed into a single stream. The audio content frames 202 and the video content frames 204 are processed by exemplary embodiments to identify content on the video stream that is indicative of the end of the video stream. While the processing of the audio content 202 will be discussed first, alternate embodiments provide for the processing of audio frames 202 when they are encountered in the video stream and the processing of video frames when they are encountered in the video stream. When the end of the video stream is detected, whether from an indication of the end of the audio content 202, from an indication of the end of the video content 204, or from a combined indication of the end of the audio 202 and the video content 204, the end detection processing of the video stream is stopped.

Figure 3:
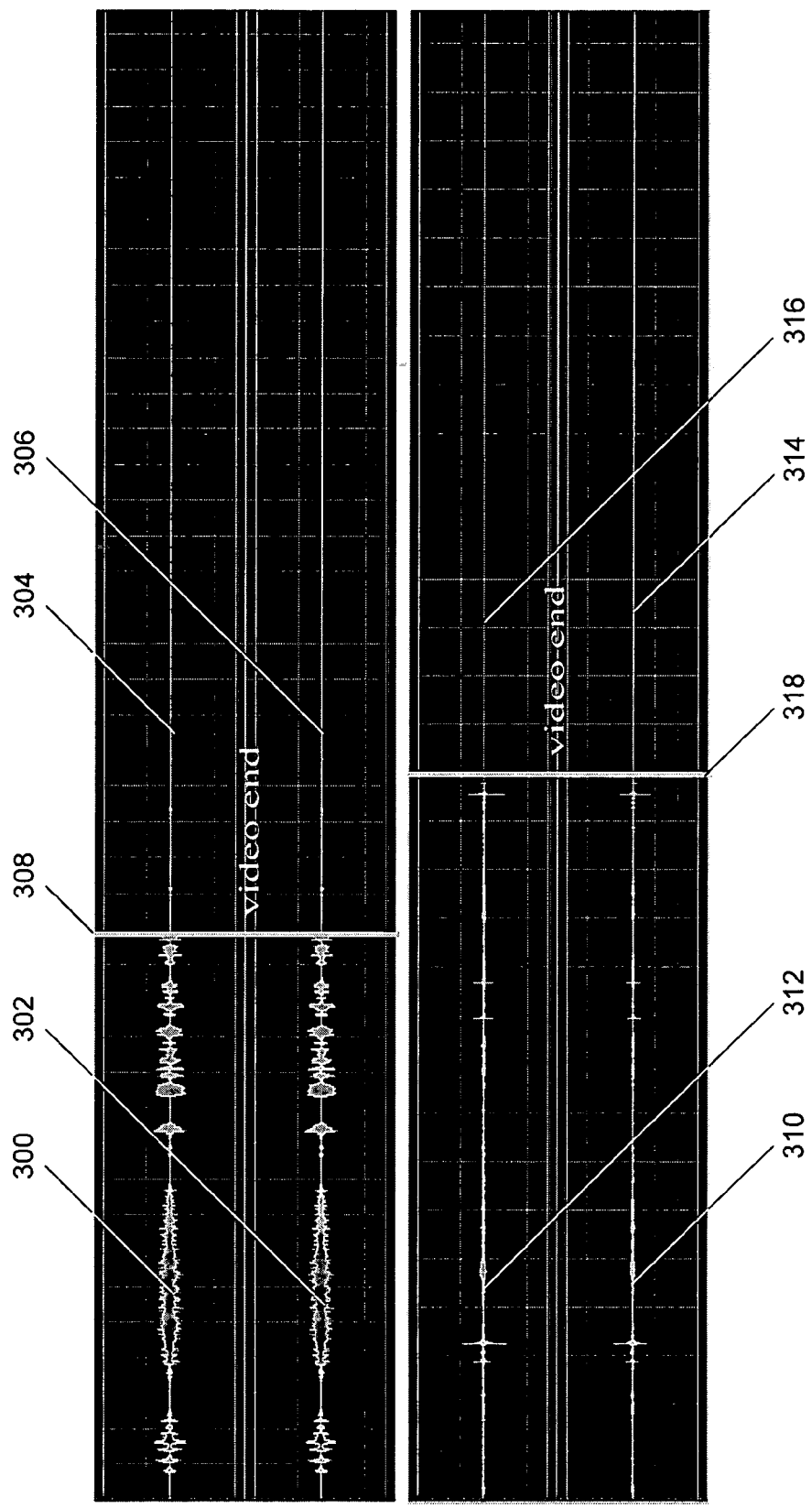
FIG. 3 shows an exemplary chart of audio waveforms before and after the end of the video stream.

As shown in FIG. 2, the audio content 202 of the video stream is processed until a period of silence 206 is detected in the audio content, or until the end of the video stream is detected as discussed below in conjunction with steps 208-214. While the audio signal in the video stream can be silent after the video ends, the audio signal following the end of the video stream can also include noise generated by circuits and components of the video recording device. Further, the audio signal can be weak and might not be much louder than a silence signal. Referring now to FIG. 3, there are shown examples of audio waveforms before and after a video end. The exemplary two channels of audio signals 300 and 302 are relatively robust as compared to the audio signals 304 and 306 following the end of the audio/video stream shown by bar 308. Audio signals 310 and 312 are examples of weak audio signals that show little amplitude difference from the corresponding audio signals 314 and 316 following the end of the audio/video stream at 318.

Figure 4:
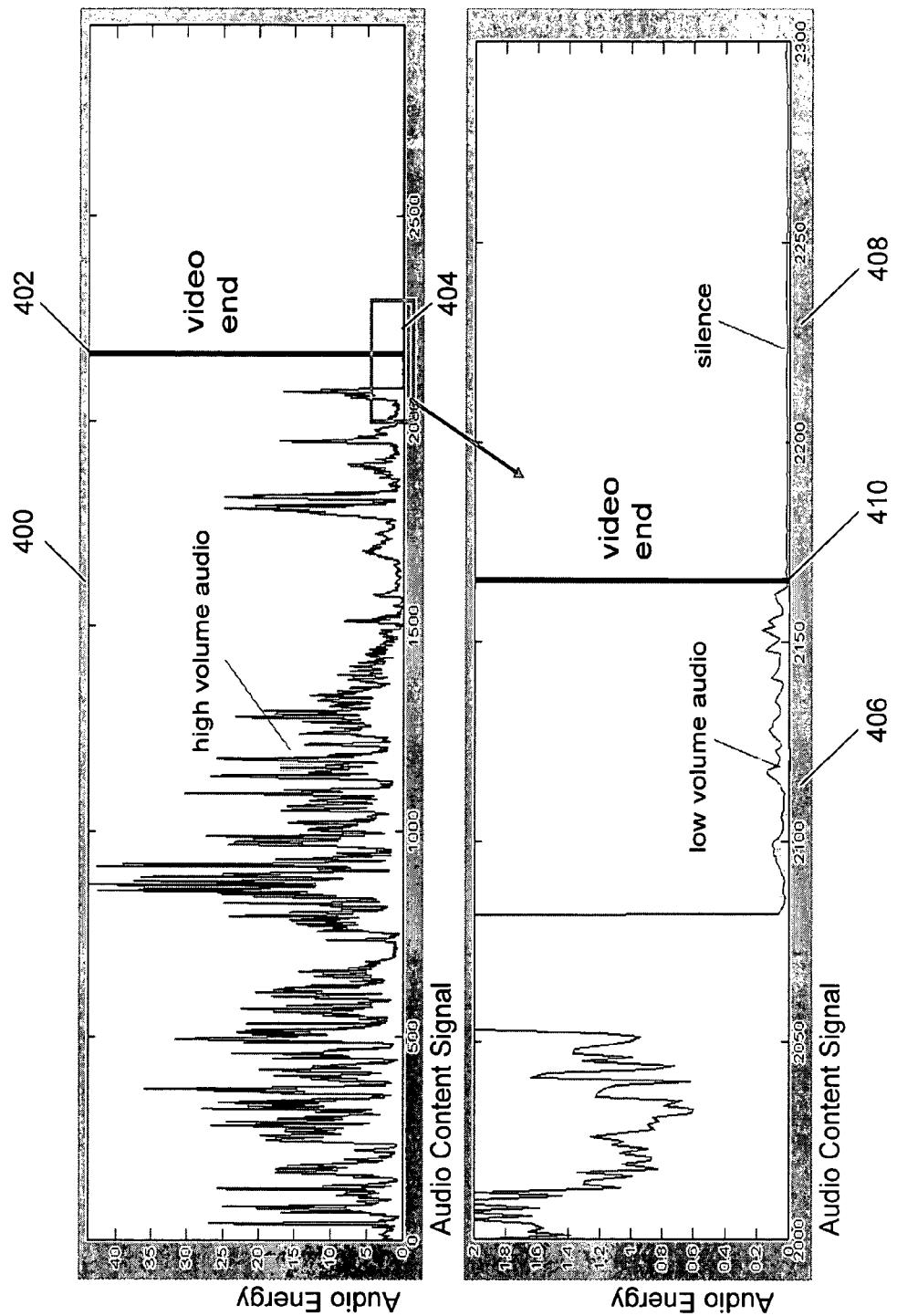
FIG. 4 shows an audio energy chart of a portion of the audio content before and after the end of the video stream.

Referring also to FIG. 4, there is shown an audio energy chart of a portion of the audio content before and after the end of the video stream. The short-time energy function of an audio signal can be computed in this implementation as:

$$E_n = \frac{1}{N} \sum_m [x(m)w(n-m)/1000]^2$$

where x(m) is the discrete time audio signal, m is time index of the audio sample, n is the time index of the short-time energy, and w(m) is a rectangle window, where $$w(m) = \begin{cases} 1 & 0 \le m \le N-1 \\ 0 & \text{otherwise} \end{cases}$$

where N is length of the window, which comprises one or more frames of the audio stream. The short-time energy function provides a convenient representation of the amplitude variation of the audio signal over the time. By assuming that the audio signal changes relatively slowly within a small interval, $E_n$ can be computed every 10-20 ms. For example and not limitation, if the sampling rate of audio signal is 8000 Hz, then $E_n$ can be computed every 100 audio samples. The window length can be set to be larger than this interval so that there is an overlap between neighboring audio frames. For example, if $E_n$ is computed every 100 samples, the window length can be set to be 150 samples.

A period of high volume audio in the form of music, speech, and the like, is shown at 400, prior to the end of the audio content at 402. A sample 404 of the audio content near the end of the audio content is enlarged in the bottom chart of the figure. Here, the presence of low volume, and low energy, audio content in the form of random noise is shown at 406 just prior to the end of the audio content, with audio silence 408 following the end of the video stream. The energy of the silence is close to zero, and significantly lower even compared to the energy of the low volume audio. The process of detecting the period of silence 408 is described as follows in conjunction with FIGS. 4 and 5.

The input audio stream content is divided into frames, or windows; and the audio energy of a sliding window is successively determined, or computed, at regular intervals along the audio content. For example and not limitation, the frame size, or window length, can be in the range of 15 milliseconds; and the audio energy can be computed, in the range of, every 10 milliseconds along the length of the audio content. The user can select a window length and the frequency of audio energy computation, such as in a range of 5 to 20 milliseconds for each; or these parameters can be allowed to default to 15 and 10 milliseconds, respectively, for example. Because the sampling interval and the window length are not equal, the sampling window is a sliding window moving along the audio stream. At the beginning of the audio energy determination process, a "potential period of silence" is set to zero. Correspondingly, the mean value of the energy level of the audio content of the video stream and the standard deviation value of the energy level of the audio content of the video stream are both set to zero at the beginning of the audio content analysis.

For each determination of the audio energy of a window along the audio content, the mean of the energy level of the audio content and the standard deviation of the energy level of the audio content are recalculated, with the standard deviation being defined as the absolute value of the difference between the mean and the audio energy level. In this manner, a running mean and a running standard deviation of the audio energy level of the audio content are maintained.

Figure 5A:
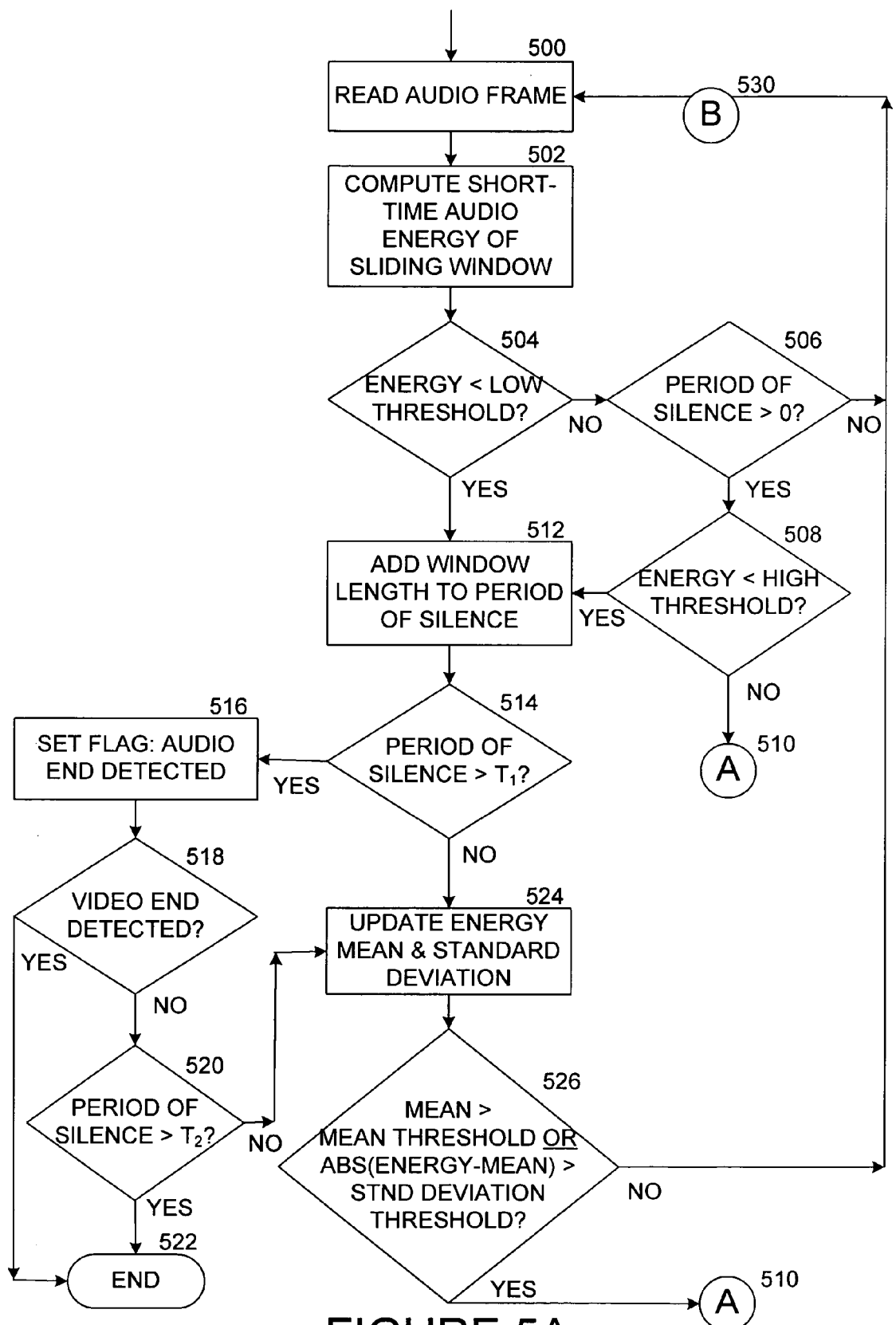
FIG. 5, consisting of FIGS. 5A and 5B, shows a block flow chart of an exemplary method for audio content analysis for detection of gap and/or end detection.

Referring now to FIG. 5A, at step 500, an audio frame of the video stream is read, and the energy of a sliding audio window is computed at step 502. The computed audio energy level of the sliding window is compared against one or more audio energy level threshold values for purposes of detecting a period of silence 206 in the audio content. These threshold values can include a low audio energy level threshold, a high audio energy level threshold, a threshold for the mean of the audio energy level, and a threshold for the standard deviation of the audio energy level. Each of these thresholds can be predetermined, or selected, by a user of the end detection system, or the thresholds can be allowed to default to particular values. If the computed audio energy level is less than the low audio energy level threshold at step 504, a period of silence in the audio content can be presumed; and the length of the sliding window is added to the length of the period of silence at 512. For example and not limitation, the low audio energy level threshold can be set to 0.03, such as for a 16-bit signed digital audio signal. The high energy level threshold can be set, for example, to 0.05.

If the computed energy of the audio window is not less than the low audio energy level threshold at 504 and if a period of silence has not been detected at 506, then ongoing audio content can be presumed and processing branches from step 506 back to step 500 to process the next window of the audio content. If, at step 506, a period of silence has been detected, then the energy level of the audio window is compared to the high audio energy level threshold at 508. If the energy level of the window is equal to or exceeds the high audio energy level threshold, then the period of silence can be presumed to have been broken, and processing branches to step 510 of FIG. 5B. At step 512, the period of silence is presumed to continue through the present audio window, and the length of the window (e.g., 10 milliseconds) is added to the period of silence.

Upon detecting a period of silence for a window of audio content, the end of the audio content cannot be automatically presumed because the window of silence might be just that—a small interrupt in the ongoing audio recording of a video stream. Therefore, the length of the silent window, e.g., 10 milliseconds, is added to a potential period of silence that was initialized to zero at the beginning of the audio content analysis process, as discussed above. The length of the potential period of silence is then compared at step 514 against a predetermined threshold for the end of audio, $T_1$. The predetermined end of audio threshold, $T_1$, can be selected by the user and can be, for example and not limitation, set to a period in the range of 2 minutes. If the potential period of silence exceeds the end of audio threshold, $T_1$, the end of the audio content of the video stream has been detected and a corresponding end of audio flag is set at 516. However, detection of the end of the audio content based on the $T_1$ threshold is not necessarily indicative of the end of the video stream because a scene can continue to be recorded onto a video stream, but with little or no sound. However, if the end of the video content has also been detected, as discussed below in conjunction with steps 208-214, then end of the video stream can be presumed to have been detected and processing branches from step 518 to the end of video stream processing at 522.

Alternately, if the period of silence exceeds an end of video stream threshold, $T_2$ at 520, where $T_2$ is greater than or equal to $T_1$, the end of the video stream is presumed to have been detected, and processing of the video stream is stopped at 522. As with the end of audio threshold, $T_1$, the end of video stream threshold, $T_2$, can be selected by the user and can be, for example and not limitation, be set to 3 minutes.

If neither the end of audio threshold, $T_1$, nor the end of video stream threshold, $T_2$, have been detected, then the mean of the energy level of the audio content and the standard deviation of the energy level of the audio content are recalculated at 524. If the recalculated mean is greater than the threshold for the mean of the audio energy level or if the recalculated standard deviation is greater than the threshold for the standard deviation of the audio energy level, then the period of silence can be presumed to have been broken, and processing branches to step 510 of FIG. 5B. Otherwise, processing of the audio content continues with the next sliding window at 500.

Figure 5B:
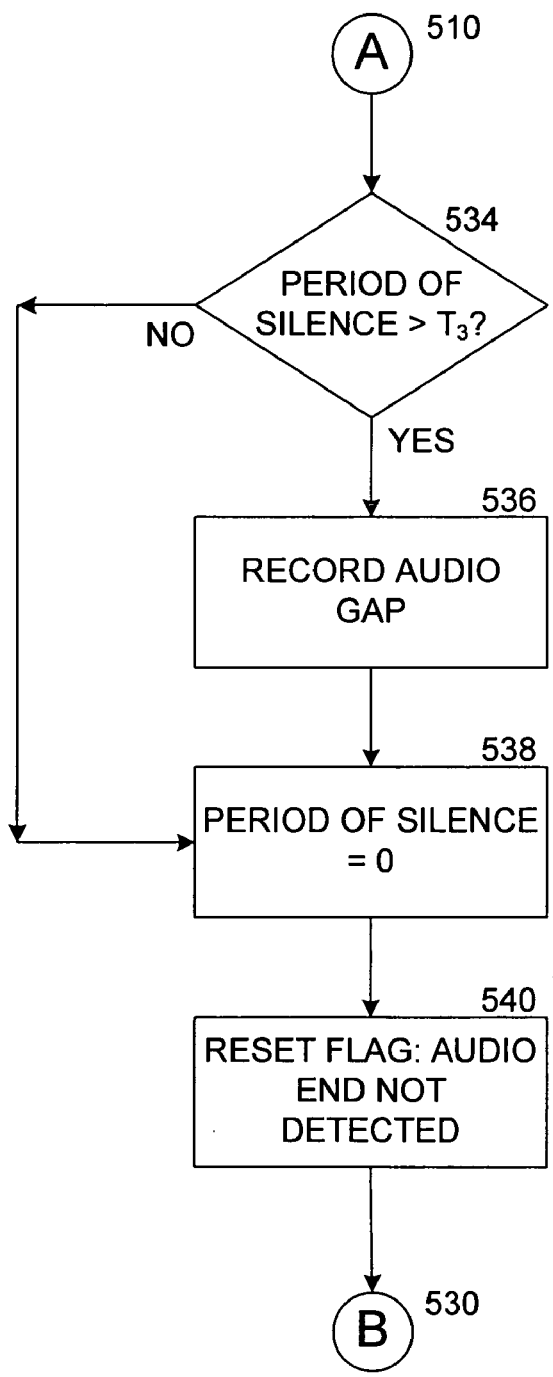

Referring now to FIG. 5B, the user has the option of recording a gap in the audio content even if a detected period of silence has been broken. If the end of the video stream has not been detected as described above; but a period of silence has been detected and has been broken, the potential period of silence can be compared at step 534 to a predetermined audio gap length threshold, $T_3$. The audio gap length threshold, $T_3$, can also be selected by the user and can be any value less than or equal to the end of video stream threshold, $T_2$, such as, for example and not limitation, 90 seconds. If the potential period of silence exceeds the gap length threshold, $T_3$, then a gap in the audio content is presumed to have been detected and an audio gap is flagged and/or recorded at 536. The recording of the audio gap can be written onto the output digitized media or in a corresponding audio edit file. At the option of the user, when the audio/visual content is written to the DVD, the written or flagged gap in the audio can be automatically edited out of the final output, or the output writing can be stopped and the user notified for determining whether to edit out the gap or keep it in the output file. Alternately, the flagged gap(s) can also be used to index the video for the purpose of video browsing.

At step 538, the potential period of silence is reset to zero, signifying the period of silence has been broken. The end of audio flag is reset at step 540, indicating that the end of the audio content has not been detected. Processing then branches back to step 500 for continued processing of the audio content.

Detection of the end of the video content of a video stream can be found by determining the color content of frames of the video content and comparing the color contents against one or more predetermined video thresholds, as represented by steps 208-214 of FIG. 2. One or more of these techniques can be applied to the video content of the video stream for purposes of detecting the end of the video content and, alone or in concert with the detection of the end of the audio content, detecting the end of the video stream.

A number of video recorders and VCR's produce default neighboring or adjacent black or blue video frames once the recorded video content ends, such as when the video content ends in the middle of a Hi-8 tape or a mini-DV tape or when the input from a VCR reaches the end of playing a VHS tape. Detecting the presence of these black or blue ending frames 208 can be indicative of the end of the video content. However, such black or blue frames are not always completely black or blue—they can contain a certain level of random noise. In addition, the luminance and hue of the blue screen may be quite different for different machines and at different times. In this embodiment, the feature of degree of histogram concentration (DHC) is defined and used to detect black and blue frames in the video content. The degree of histogram concentration of the green color component in a RGB format frame is computed as follows. First, the histogram of the green color is calculated through all pixels of the frame. Next, the highest green color histogram value is found. Then, the histogram values within a small range (empirically determined) around the highest value are summed together. The range of these histogram values can be selected by the user or can default to a predetermined, finite range.

Figure 6:
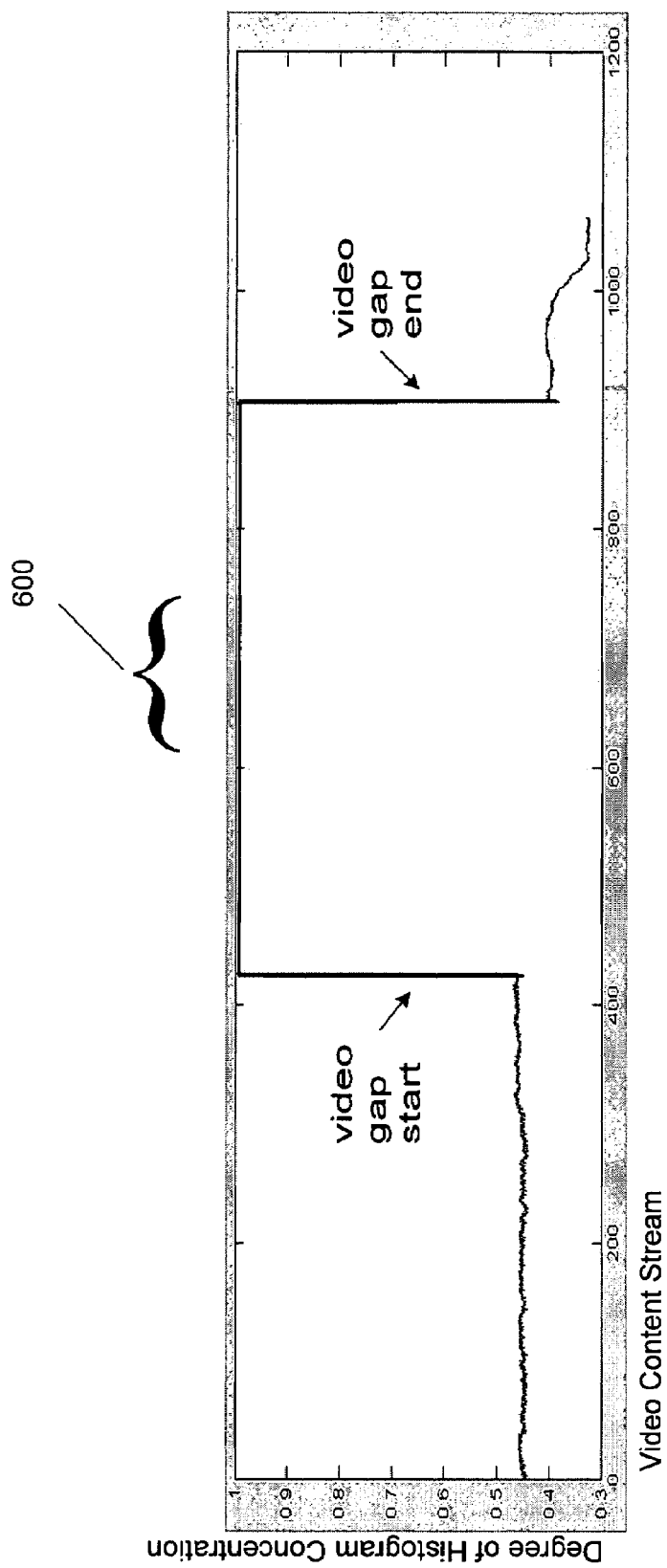
FIG. 6 shows the degree of histogram concentration around a gap in the video content.

The sum of the range of green histogram values is divided by the total number of pixels of the frame (i.e., the sum of all histogram values for the frame), and the resultant ratio is the degree of green histogram concentration. The same process is used to compute the degree of histogram concentration of the red and the blue colors, and the three ratios are averaged to compute an overall degree of histogram concentration for the frame. The computed DHC is compared against a predetermined color histogram concentration threshold to determine whether the frame is a black frame or a blue frame that is indicative of the end of the video content. If the computed DHC exceeds the color histogram concentration threshold, then a black or blue frame that is indicative of the end of the video content can be presumed. The color histogram concentration threshold can be set, for example, to 0.8. If no such comparison results are found, then the next frame of the video content is processed against the color histogram concentration threshold, as described above. In an alternate embodiment, the DHC of only one color component is used for comparison. In yet another embodiment, an average DHC of two or three color components can be used for the comparison. While using more color components provides higher fidelity, using fewer color components can save processing time. The DHC analysis feature can be used to detect not only black or blue frames, but also can be used to detect any other frame with a uniform color over the frame. Moreover, the DHC analysis feature is quite robust to common noises in such frames, including text information in the frame from some VCR output. Referring now to FIG. 6, there is shown an exemplary chart of the degree of histogram concentration around a 15 second gap 600 in the video content. During the gap 600, the DHC value is very close to 1, while it is much lower than 1 during normal video content.

As discussed above regarding the audio content, a single occurrence of a black or a blue frame is not necessarily indicative of a stream of black or blue frames that represents the end of the video content. Accordingly, the length of the black or blue frame is added to a running length of black/blue content that was initialized to zero at the beginning of the black/blue analysis of the video content. If the frame is determined to be neither a black or a blue frame, the running length of black/blue content is reinitialized to zero, signifying the end of a series of neighboring black or blue frames.

The running length of black content or blue content represents the total length of neighboring black frames or neighboring blue frames. If the running length of the black/blue content exceeds a predetermined end of video threshold, $T_4$, then end of the video content of the video stream can be presumed. However, determination of the end of the video content based on the $T_4$ threshold is not necessarily indicative of the end of the video stream because a scene can continue to be recorded onto a video stream when, for example, the cap has been placed over the lens of the camera. Therefore, if the running length of black/blue frames exceeds an end of video stream threshold, $T_5$, where $T_5$ is greater than or equal to $T_4$, the end of the video stream is presumed to have been detected, and processing of the video stream is stopped. The respective $T_4$ and $T_5$ thresholds for the video content can be, but need not be, set to the same values as the corresponding audio content thresholds $T_1$ and $T_2$ and can correspondingly be set by a user or to default values.

If the audio content processing has encountered a period of silence exceeding the end of audio threshold, $T_1$; and if the video content processing has encountered an event, such as the running length of the blue/black frames, exceeding the end of video threshold, $T_4$, then the end of the video stream has been detected and processing of the video stream is stopped.

In a manner similar to the processing of the audio content, the processing of the video content can include a comparison of the video detection event, such as the length of the blue/black frames, against a video gap threshold, $T_6$, for identifying a gap in the video content and for determining whether to process the video frames in the gap or to flag the gap in the output digitized media. The $T_6$ video gap threshold can be, but need not be, the same as the $T_3$ audio gap threshold. In the video content processing steps 210-214 discussed below, similar comparisons are made against the $T_4$, $T_5$, and $T_6$ threshold values for detecting the end of the video content and the end of the video stream.

At step 210, the presence of successive static frames is analyzed. Occasionally, incoming video frames become static after the video content ends. For example, when playing VCD or DVD, the video content automatically goes to a logo page (e.g. of the DVD player) or a menu page (e.g., of the DVD content) after the program is over. While the frames themselves are intended to be and appear to be static, or unchanging, from frame to frame, there are actually color differences among the frames due to the existence of noise. Therefore, a pixel to pixel comparison of successive frames does not work because the noise-affected differences between the static frames might be larger than between successive frames in an actual video stream.

Figure 7:
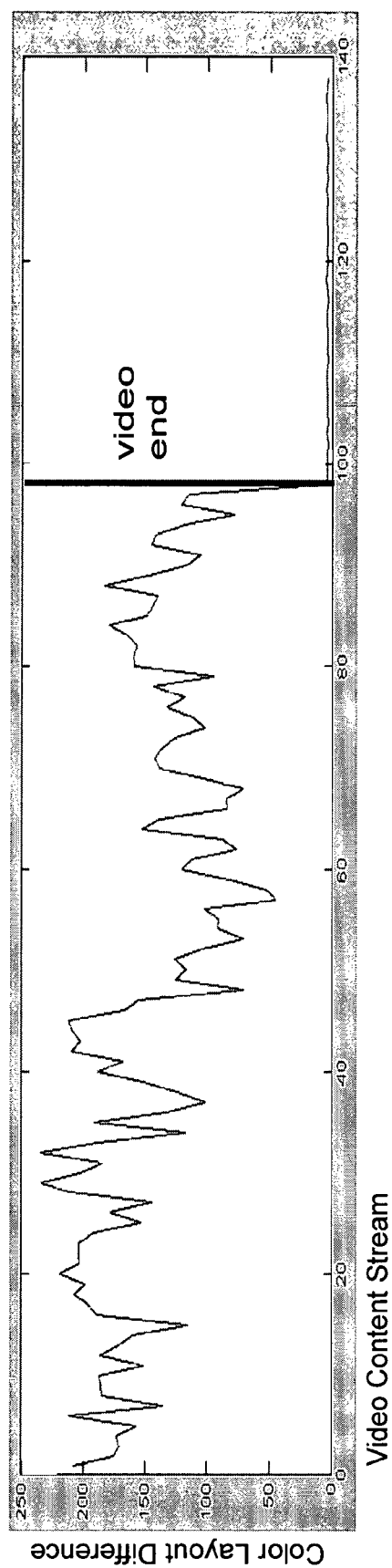
FIG. 7 shows a chart of the color layout difference of a portion of the video content before and after the end of the video stream.

In the exemplary embodiment of step 210, the color layout difference (CLO) between neighboring frames is used to detect the presence of static frames. To compute the CLO of two successive or neighboring video frames, each video frame is divided into a number of blocks. The difference of the average color between each pair of corresponding blocks in the frames is calculated, and the biggest difference value is taken as the CLO for the frame pair. FIG. 7 shows an exemplary chart of CLO values for successive video frame pairs along a video content stream. Alternately, the largest N difference values can be averaged and taken as the CLO, where N can be 1, 2, 3, etc. Then, the CLO is compared against a predetermined color layout difference threshold to detect a static frame. If the calculated CLO is less than the color layout difference threshold, then a static frame can be presumed. The color layout difference threshold can be set, for example, to 30 for a 24-bit RGB color frame.

As discussed above regarding encountering an audio silent frame, the occurrence of a single static frame pair is not necessarily indicative of the end of the video content, so the length of the static frame is added to a running length of static frames that was initialized to zero at the beginning of the static frame analysis of the video content. If the frame is determined to not be a static frame, the running length of static frames is reinitialized to zero, signifying the end of a series of neighboring static frames.

If the running length of the static frames exceeds a predetermined end of video threshold, $T_4$, then end of the video content of the video stream can be presumed. Similar comparisons are made against the $T_5$ and $T_6$ thresholds for detecting the end of the video stream and for handling a gap in the video content.

At step 212, the video content is analyzed for the presence of grayscale noise, which can be indicative of the end of video content. Video frames can have random grayscale noise after the end of the video content, such as for example, in the middle of a VHS tape. Random grayscale noise can be detected by the presence of red, green, and blue color values that are very close, if not identical, to each other. Therefore, in the embodiment shown at step 212, the difference between the red and the green colors (RGD) is used to detect grayscale noise on the video frame.

Figure 8A:
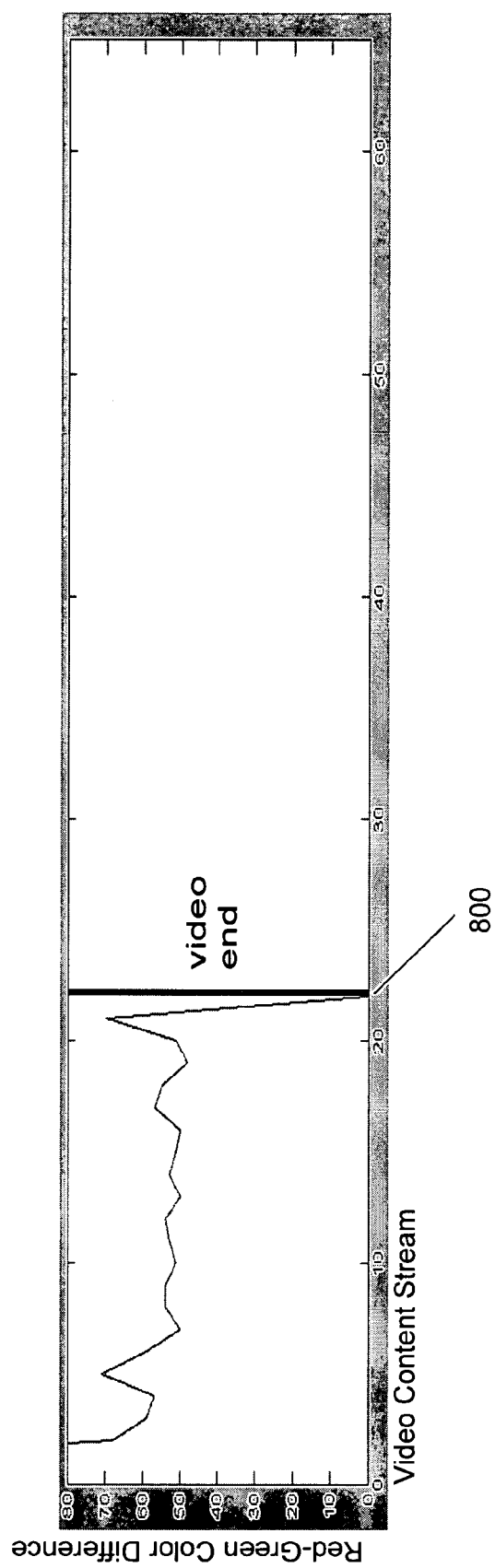
FIG. 8, consisting of FIGS. 8A and 8B, shows charts of the red-green difference of a portion of the video content of a video stream.
Figure 8B:
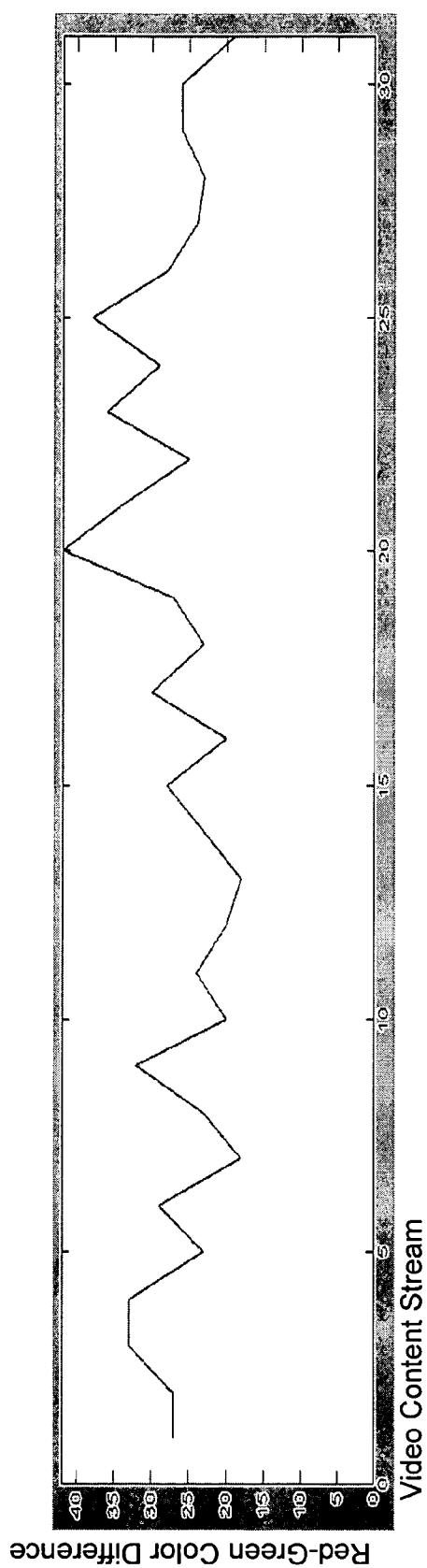

For each pixel in the video frame, the absolute difference between the red component and the green component is calculated. Then, the largest red-green difference value in the frame is defined as the RGD of the frame. FIG. 8A shows an exemplary chart of RGD values of a video content stream, with the RGD values moving to zero at the end of the video stream. The RGD is compared with a predetermined red-green difference threshold to detect whether the frame is a frame of gray-scale noise. If the calculated RGD is less than the red-green difference threshold, such as at relative position 800 in FIG. 8A, then a grayscale noise frame can be presumed, as well as the end of the video content. The red-green difference threshold can be set, for example, to 1.0 for a 24-bit RGB color frame. Further, the RGD measure can also be effective for differentiating grayscale noise from digitized black & white video content. For example, FIG. 8B shows the red-green difference values calculated for a black & white movie, which can be seen as being much higher than 1.0. Therefore, the end of black & white video recordings can be accurately detected with the red-green difference embodiment as well.

As discussed above, the occurrence of a single grayscale noise frame is not necessarily indicative of the end of the video content, so the length of the grayscale noise frame is added to a running length of grayscale noise frames that was initialized to zero at the beginning of the grayscale noise frame analysis of the video content. If the frame is determined to not be a grayscale noise frame, the running length of grayscale noise frames is reinitialized to zero, signifying the end of a series of neighboring grayscale noise frames.

If the running length of the grayscale noise frames exceeds a predetermined end of video threshold, $T_4$, then end of the video content can be presumed. Similar comparisons are made against the $T_5$ and $T_6$ thresholds for detecting the end of the video stream and for handling a gap in the video content.

At step 214, the color noise of the video frames is detected as an indicator of the end of the video content. Video content often does not have large color histogram differences from frame to frame because the video represents an ongoing scene of action, unless a shot boundary occurs, which does not happen frequently in video content. An exemplary shot boundary is shown at 902 of FIG. 9 and represents the junction between two different video shots in the video content, such as when the video stops on one scene or event and then starts on a successive scene or event.

At the end of the video content, however, the incoming video frames can include random color noise that can be detected by the presence of frequent large color histogram differences from frame to frame. In the embodiment represented by step 214, the color histograms of neighboring video frames are compared to detect random color noise that can be indicative of the end of the video content. Video frames can have high peak values of color histogram differences from frame to frame, often resulting from shot cuts from the video content. However, random color noise frames have high peak values of color histogram differences between neighboring frames that appear much more frequently than in normal video content. Even though the video content of commercials have periods of dense high peaks of color histogram difference due to frequent shot cuts, these periods do not last as long as in random color noise screens, and are not as regular as well.

Figure 9:
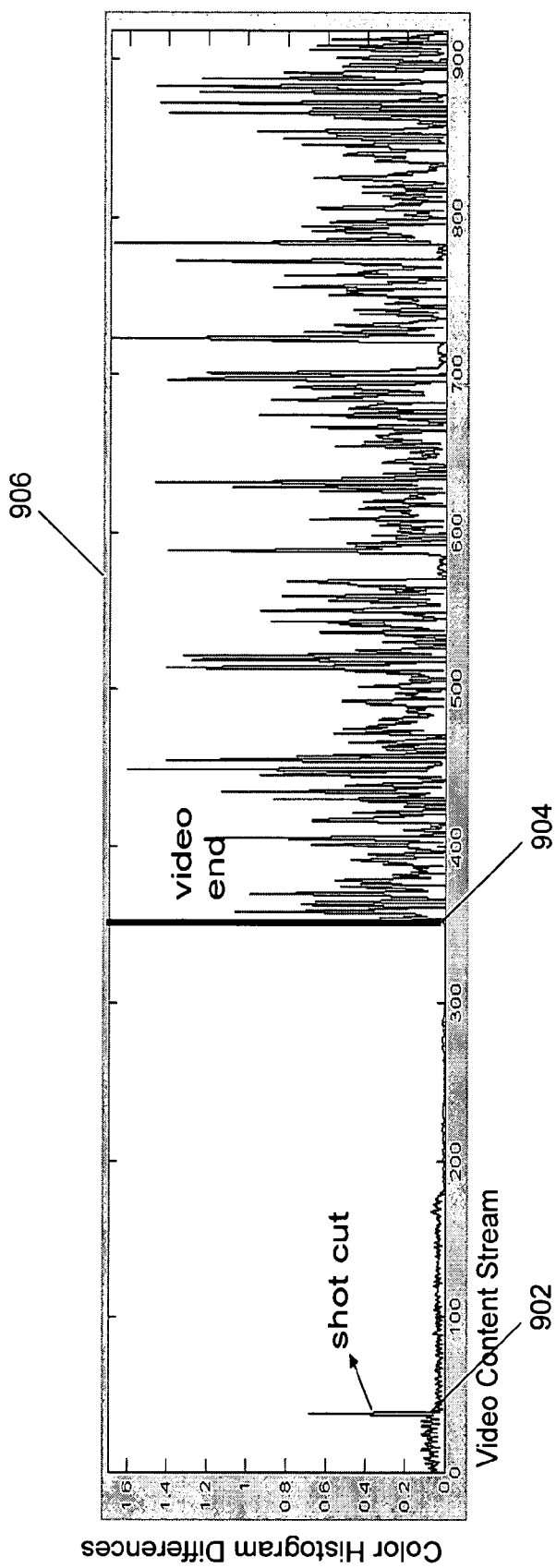
FIG. 9 shows a chart of the color histogram differences between two neighboring video frames before and after the end of the video stream.

The color histograms of a pair of adjacent, or neighboring, video frames are calculated, and the color histogram difference between the two histograms is computed. An exemplary chart of the color histogram difference between pairs of neighboring frames is shown in FIG. 9, with the horizontal axis representing time and the vertical axis representing the histogram difference amplitude between consecutive frames. A shot cut is shown at 902. The peaks of the color histogram difference between two neighboring frames following the end of the video content at 904 are shown at 906. The color histogram difference between neighboring peaks is calculated. In one embodiment, only those peaks that exceed a predetermined amplitude, such as 0.3 for normalized color histogram differences, are considered. The distance between neighboring peaks is compared against a predetermined distance threshold. If the distance is less than the distance threshold (such as 50 frames distance between the peaks, for example), the presence of random color noise indicative of the end of the video content is presumed. For example, the end of the video content is presumed if there is at least one color histogram difference peak (with an amplitude higher than 0.3 in this example) at least once every 50 frames.

As discussed above, the occurrence of a single random color noise frame is not necessarily indicative of the end of the video content, so the length of the random color noise frame is added to a running length of random color noise frames that was initialized to zero at the beginning of the random color noise frame analysis of the video content. If the frame is determined to not be a random color noise frame, the running length of random color noise frames is reinitialized to zero, thereby signifying the end of a series of neighboring random color noise frames. If the running length of the random color noise frames exceeds a predetermined end of video threshold, $T_4$, then end of the video content can be presumed. Similar comparisons are made against the $T_5$ and $T_6$ thresholds for detecting the end of the video stream and for handling a gap in the video content.

In exemplary embodiments, the audio content and the video content of the input video stream are analyzed separately, as discussed above and as shown in FIG. 2. Each or any of the detections of the end of the video content can set a video flag for use in step 518 of the audio content analysis of FIG. 5. The results of the audio and video analyses can be integrated at step 216 of the end detection system/software for detecting the end of the video stream. These results can include, but are not limited to, an integrated audio/video stream that includes tags and gap markers for both audio content and video content and includes an end of video stream marker.

The user has several options for detecting the end of the video stream based on the prior detection of the end of the audio content and/or the end of the video content. For example, the user can instruct the end detection system to conclude that the end of the video stream has been detected when the length of the silence exceeds the end of audio threshold, $T_1$ and when the running length of detected video content exceeds the end of video threshold, $T_4$. If the length of silence exceeds the end of audio content threshold, $T_2$; or if any of the running length of video contents exceeds the end of video content threshold, $T_5$, then end of the video stream is detected. Also, the user can instruct the end detection system to conclude that the end of the video stream has been detected upon the detection of the end of the audio content at step 206 or the end of the video content at any of the steps 208-214. Alternately, the user can instruct the system to detect the end of the video content only upon the detection of the audio content at step 206 and upon the detection of the end of the video content at any of the steps 208-214. Any combination of these end of audio/video content steps can be selected by the user, and in any sequence, for determining the end of the video stream itself, as represented by step 216. Further, the user can instruct the system to skip any of the steps 206-214 should the user find the analysis of any of these steps unnecessary for detecting the end of the particular video stream under analysis. Further, the user can weight the analysis process by selecting different gap lengths and end of content lengths for the various end of content detection steps and thereby requiring certain detection steps to determine a longer or a shorter content length before determining that the end of the audio/video content has been detected.

When the end of video stream has been detected, the video end is claimed by the system; and the digitization process is stopped. Audio and/or video gaps are also reported by the system, and the gaps can automatically be eliminated from the digitized output or can be flagged for the user to determine whether to eliminate the gaps, one at a time. Information compiled by the end detection system, including status reporting while the end detection system is processing and statistics available at the end of the process, can be reported to a user via any number of known means, such as a graphical user interface or screen, 120, or printer 122. The reports can include, for example and not limitation, the frame numbers and time stamps along the video streams for any audio and video gaps, the frame number and the time stamp of the detected end of the video stream, and the duration in time of the video stream.

Exemplary embodiments provide for several techniques for expediting the processing of the audio and video content. The frame size of the digital video can be down-sampled to 360 by 240 or even 180 by 120 pixels per frame prior to applying the frame analysis of steps 208-214, without affecting the accuracy of video end/gap detection. The speed of video analysis will be dramatically improved due to the smaller frame size, and the output DVD can still be written at a denser scale, such as 720 by 480 pixels. The degree of histogram concentration, the color layout difference, and the red-green color difference analyses need not be computed for every frame and, instead, can be computed once every N frames (N can be 5, 10, etc.). Such a sampling of video frames can actually help the detection of video content gaps and ends, because the difference of blank video from real video content will be enlarged. For the color histogram difference feature of step 214, the number N can be up to five without affecting detection results. Frame sampling will also dramatically improve the video processing speed. Also, the histogram resolution can be reduced from 256 color bins (for 8-bit color resolution) to 64 bins without affecting the detection result while improving processing time.

The audiovisual data to be processed in Hewlett Packard's DVD Movie Writer™ is MPEG encoded, and exemplary embodiments can process such coded data. However, exemplary embodiments are not limited to the MPEG format and can be applied to any format of video data. Further, the processing of the audio and video content can be tuned to particular applications and content with the selection of particular thresholds and values for directing the audio/video content processing.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A computer-implemented method for automatic detection of the end of a video stream, wherein the video stream includes audio content and video content, comprising:
   determining an energy level of a window of the audio content;
   comparing the audio energy level against one or more audio energy level thresholds;
   determining a color content of a frame of the video content;
   comparing the determined color content against one or more video thresholds; and
   detecting the end of the video stream based on at least one of the audio energy level and the color content comparisons.

2. The method according to claim 1, wherein the video stream is one of an analog video stream and a digital video stream.

3. The method according to claim 1, wherein the audio energy level is computed in the range of every 10 milliseconds.

4. The method according to claim 1, wherein the length of the window is in the range of 15 milliseconds.

5. The method according to claim 1, wherein the one or more audio energy level thresholds include at least one of low audio energy level threshold, high audio energy level threshold, threshold for the mean of the audio energy level, and threshold for the standard deviation of the audio energy level.

6. The method according to claim 1, wherein the audio energy level thresholds and the video thresholds are user selectable.

7. The method according to claim 5, where the mean of the energy level of the audio content and the standard deviation of the energy level of the audio content are set to zero at the beginning of the audio energy determination step.

8. The method according to claim 5, wherein determining an energy level of a window of the audio content includes:
   computing the audio energy level of a sliding window along the audio content;
   recalculating a mean of the energy level of the audio content, based on the computed audio energy level, thereby calculating a running mean of the audio energy level; and
   recalculating a standard deviation of the energy level of the audio content, based on the computed audio energy level, thereby calculating a running standard deviation of the audio energy level.

9. The method according to claim 8, wherein detecting the end of the video stream includes detecting at least one of the end of the audio content and the end of the video content.

10. The method according to claim 1, wherein detecting the end of the video stream includes detecting at least one of the end of the audio content and the end of the video content.

11. The method according to claim 9, wherein the end of the video stream is detected by detecting a period of audio silence on the video stream.

12. The method according to claim 9, wherein the end of the audio content is detected upon detecting a period of silence in the audio content.

13. The method according to claim 12, wherein a window of silence in the audio content is detected upon determining that the computed audio energy level of the window is less than the low audio energy level threshold.

14. The method according to claim 13, wherein detecting a period of silence includes:
   adding the window of audio silence to a potential period of silence;
   comparing the potential period of silence against a predetermined end of audio threshold; and
   determining the end of the audio content has been detected if the potential period of silence exceeds the predetermined end of audio threshold.

15. The method according to claim 14, wherein the predetermined end of audio threshold is selected to be a time length in the range of 2 minutes.

16. The method according to claim 14, including:
   comparing the potential period of silence against a predetermined end of video stream threshold; and
   determining the end of the video stream has been detected if the potential period of silence exceeds the predetermined end of video stream threshold.

17. The method according to claim 16, wherein the predetermined end of video stream threshold is selected to be a time length that is equal to or greater than the predetermined end of audio threshold.

18. The method according to claim 14, including:
   comparing the potential period of silence against a predetermined audio gap length threshold; and
   determining a gap in the audio content has been detected if the potential period of silence exceeds the predetermined audio gap length threshold.

19. The method according to claim 18, including flagging the audio gap onto an output digitized video stream.

20. The method according to claim 14, wherein the period of silence is presumed to have been broken upon the occurrence of at least one of the following:
   the computed audio energy level of the window is greater than the high audio energy level threshold;
   the calculated running mean of the audio energy level exceeds the threshold for the mean of the audio energy level; and
   the calculated running standard deviation of the audio energy level exceeds the threshold for the standard deviation of the audio energy level.

21. The method according to claim 1, wherein the one or more video thresholds include at least one of color histogram concentration threshold, color layout difference threshold, red-green difference threshold, and color histogram difference distance threshold.

22. The method according to claim 21, wherein comparing the color content against one or more video thresholds includes:
   calculating a histogram for each of the green, red, and blue colors of the video frame;
   determining the highest histogram value for each of the green, red, and blue histograms;
   summing together a predetermined number of histogram values around the highest histogram value for each of the green, red, and blue colors;
   dividing the summed histogram values for each of the green, red, and blue colors by the number of pixels in the video frame to produce ratios of green, red, and blue histogram concentrations;
   averaging one or more of the green, red, and blue histogram concentrations to produce a degree of histogram concentration; and comparing the degree of histogram concentration against a predetermined color histogram concentration threshold for determining an ending video frame.

23. The method according to claim 22, wherein detecting the end of the video stream includes:
adding the lengths of neighboring ending video frames together, wherein the neighboring ending video frames comprise one of neighboring black video frames and neighboring blue video frames;
comparing the added length of the neighboring ending video frames against a predetermined end of video threshold; and
determining the end of the video content has been detected if the added length of the neighboring ending video frames exceeds the predetermined end of video threshold.

24. The method according to claim 23, including:
comparing the added length of the neighboring ending video frames against an end of video stream threshold; and
determining the end of the video stream has been detected if the added length of the neighboring ending video frames exceeds the end of video stream threshold.

25. The method according to claim 23, including:
comparing the added length of the neighboring ending video frames against a video gap threshold; and
determining a gap in the video content has been detected if the added length of the neighboring ending video frames exceeds the video gap threshold.

26. The method according to claim 25, including flagging the video gap onto an output digitized video stream.

27. The method according to claim 21, wherein comparing the color content against one or more video thresholds includes:
dividing each of two neighboring video frames into a predetermined number of blocks;
calculating a difference of the average color between each two corresponding blocks of the two frames;
determining the largest calculated color difference; and
comparing the largest calculated color difference against a predetermined color layout difference threshold for determining the presence of a static frame.

28. The method according to claim 27, wherein detecting the end of the video stream includes:
adding the lengths of neighboring static video frames together;
comparing the added length of the static video frames against a predetermined end of video threshold; and
determining the end of the video content has been detected if the added length of the static video frames exceeds the predetermined end of video threshold.

29. The method according to claim 28, including:
comparing the added length of the static video frames against an end of video stream threshold; and
determining the end of the video stream has been detected if the added length of the static video frames exceeds the end of video stream threshold.

30. The method according to claim 28, including:
comparing the added length of the static video frames against a video gap threshold; and
determining a gap in the video content has been detected if the added length of the static video frames exceeds the video gap threshold.

31. The method according to claim 30, including flagging the video gap onto an output digitized video stream.

32. The method according to claim 21, wherein comparing the color content against one or more video thresholds includes:
calculating, for each pixel in the video frame, the absolute difference between the red color value and the green color value;
determining the largest red/green difference value; and
comparing the largest red/green difference value against a predetermined red-green difference threshold for determining a frame of grayscale noise.

33. The method according to claim 32, wherein detecting the end of the video stream includes:
adding the lengths of neighboring grayscale noise frames together;
comparing the added length of the grayscale noise frames against a predetermined end of video threshold; and
determining the end of the video content has been detected if the added length of the grayscale noise frames exceeds the predetermined end of video threshold.

34. The method according to claim 33, including:
comparing the added length of the grayscale noise frames against an end of video stream threshold; and
determining the end of the video stream has been detected if the added length of the grayscale noise frames exceeds the end of video stream threshold.

35. The method according to claim 33, including:
comparing the added length of the grayscale noise frames against a video gap threshold; and
determining a gap in the video content has been detected if the added length of the grayscale noise frames exceeds the video gap threshold.

36. The method according to claim 35, including flagging the video gap onto an output digitized video stream.

37. The method according to claim 21, wherein comparing the color content against one or more video thresholds includes:
calculating a color histogram for each of two neighboring video frames;
identifying computed histogram difference peaks whose amplitude exceed a predetermined threshold;
calculating the distance between neighboring identified histogram difference peaks; and
comparing the calculated peak distance against a predetermined distance threshold for determining the presence of a random color noise frame in the video content.

38. The method according to claim 37, wherein detecting the end of the video stream includes:
adding the lengths of neighboring random color noise frames together;
comparing the added length of the random color noise frames against a predetermined end of video threshold; and
determining the end of the video content has been detected if the added length of the random color noise frames exceeds the predetermined end of video threshold.

39. The method according to claim 38, including:
comparing the added length of the random color noise frames against an end of video stream threshold; and
determining the end of the video stream has been detected if the added length of the random color noise frames exceeds the end of video stream threshold.

40. The method according to claim 38, including:
comparing the added length of the random color noise frames against a video gap threshold; and
determining a gap in the video content has been detected if the added length of the random color noise frames exceeds the video gap threshold.

41. The method according to claim 40, including flagging the video gap onto an output digitized video stream.

42. The method according to claim 1, wherein one or more of the audio energy level thresholds and the one or more video thresholds are used for detecting the end of the video stream.

43. A computer-based system for automatic detection of the end of a video stream that includes audio content and video content, comprising:
- a processor for executing computer instructions that:
  - compute the audio energy level of a window of the audio content;
  - compare the computed audio energy level against one or more predetermined audio energy level thresholds;
  - determine the color content of a frame of the video content;
  - compare the video frame color content against one or more predetermined video thresholds; and
  - detect the end of the video stream based on the comparison of the audio and video content against the one or more predetermined thresholds.

44. A computer readable medium encoded with computer-executable instructions, which, when executed by a computer, provide for the automatic detection of the end of a video stream, wherein the instructions are provided for:
- inputting a video stream comprising windows of audio content and frames of video content;
- computing an audio energy level of a window of the audio content;
- comparing the computed audio energy level against one or more audio energy level thresholds;
- computing a color content of a frame of the video content;
- comparing the computed color content against one or more video thresholds; and
- detecting the end of the video stream based on at least one of the audio energy level comparison and the color content comparison.

45. The computer readable medium according to claim 44, wherein the instructions provide for detecting the end of the video stream by detecting at least one of the end of the audio content and the end of the video content.

46. A computer-implemented system for automatic detection of the end of a video stream, comprising:
- means for inputting a video stream comprising audio content windows and video content frames;
- means for computing an energy level of a window of the audio content;
- means for comparing the determined audio energy level against one or more audio energy level thresholds;
- means for computing a color content of a frame of the video content;
- means for comparing the determined color content against one or more video thresholds; and
- means for detecting the end of the video stream based on at least one of the audio energy level comparison and the color content comparison.

47. The system according to claim 46, wherein detecting the end of the video stream includes detecting at least one of the end of the audio content and the end of the video content.

* * * * *